United States Patent [19]

Netravali et al.

[11] Patent Number: 5,574,919
[45] Date of Patent: Nov. 12, 1996

[54] METHOD FOR THINNING A PROTOCOL

[75] Inventors: Arun N. Netravali, Westfield; Krishan K. Sabnani, Berkeley Heights, both of N.J.

[73] Assignee: Lucent Technologies Inc., Murray Hill, N.J.

[21] Appl. No.: 606,231

[22] Filed: Feb. 23, 1996

Related U.S. Application Data

[63] Continuation-in-part of Ser. No. 752,127, Aug. 29, 1991, Pat. No. 5,327,544.

[51] Int. Cl.[6] ................................................. G06F 13/00
[52] U.S. Cl. ............................................................ 395/561
[58] Field of Search ...................................... 395/650, 700, 395/500

[56] References Cited

U.S. PATENT DOCUMENTS

| | | | |
|---|---|---|---|
| 4,692,921 | 9/1987 | Dahbura et al. | 371/27 |
| 4,991,176 | 2/1991 | Dahbura et al. | 371/27 |
| 5,067,104 | 11/1991 | Krishnakumar et al. | 395/375 |
| 5,084,877 | 1/1992 | Netravali et al. | 371/32 |
| 5,130,986 | 7/1992 | Doshi et al. | 370/94 |
| 5,327,544 | 7/1994 | Lee et al. | 395/500 |

OTHER PUBLICATIONS

A. S. Tanenbaum, "Computer Networks," Prentice–Hall Software Series, 10–16, 1981.

Engineering and Operations in the Bell System, Second Edition, Reorganized and Rewritten Telecommunications in the Bell System in 1982–1983, Prepared by Members of the Technical Staff and the Technical Publication Department, AT&T Bell Laboratories, 316–317, 1977.

C. H. West, "General Technique for Communications Protocol Validation," IBM J. Res. Develop., vol. 22, No. 4, 393–404, Jul. 1978.

C. H. West, "An Automated Technique of Communications Protocol Validation," IEEE Transactions on Communications, vol. COM–26, No. 8, 1271–1275, Aug. 1978.

G. V. Bochmann and C. A. Sunshine, "A Survey of Formal Methods," Computer Network Architectures and Protocols, Plenum Press, New York and London, 561–578 (1982).

C. A. R. Hoare, "Communicating Sequential Processes," Communications of the ACM, vol. 21, No. 8, 666–677, Aug. 1978.

M. U. Uyar et al., "Algorithmic Verifications of ISDN Network Layer Protocol," AT&T Technical Journal, 17–31, Jan./Feb. 1990.

K. K. Sabnani et al., "An Algorithmic Procedure for Checking Safety Properties Prococols," IEEE Transactions on Communications, vol. 37, No. 9, 940–948, Sep. 1989.

A. N. Netravali et al., "Design and Implementation of a High–Speed Transport Protocols," IEEE Transactions on Communications, vol. 38, No. 11, 2010–2024, Nov. 1990.

D. Lee et al., "Conformance Testing of Protocols Specified as Communicating FSMs," IEEE Infocom '93 Proceedings, vol. 1, 115–127, Mar./Apr. 1993.

Primary Examiner—Alvin E. Oberley
Assistant Examiner—John A. Chavis
Attorney, Agent, or Firm—Katharyn E. Olson

[57] ABSTRACT

A method for simplifying computer protocols is disclosed which offers advantages in reducing the memory and processing requirements for invoking the protocol. In accordance with the present invention, a protocol is represented as a collection of communicating finite machines. The subset of services offered by the protocol desired by a user is also specified as a finite state machine. The method finds the thinned version of the protocol by comparing the finite state machine representation of the protocol with the finite state machine representation of the subset of desired services and keeps only that part of the protocol necessary for providing the desired subset of services.

6 Claims, 10 Drawing Sheets

FIG. 9 trans

FIG. 10

Retimer

FIG. 11 rec

FIG. 14 buf

FIG. 15

Atimer

FIG. 19 trans

FIG. 20

Retimer

FIG. 24 trans?fill buf

FIG. 25

*DELETED*

Atimer

FIG. 26

METHOD FOR THINNING A PROTOCOL

RELATED APPLICATIONS

This application is a continuation-in-part of U.S. application Ser. No. 752,127, filed Aug. 29, 1991, which issued on Jul. 5, 1994, as U.S. Pat. No. 5,327,544, to Lee et al.

TECHNICAL FIELD

This invention relates to methods for simplifying a protocol—such as a connection protocol used in a communication system—when only a subset of the services provided by the protocol is required. In particular, the invention thins a protocol using finite state machine representations.

BACKGROUND OF THE INVENTION

Figure 1:
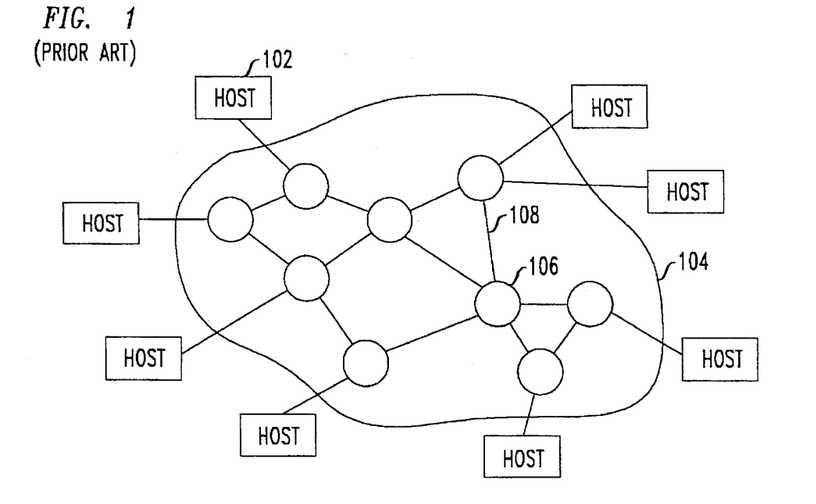
FIG. 1 illustrates a computer network.

Computer networks, i.e. interconnected collections of autonomous computers, provide a variety of services such as electronic mail and file transfer services. FIG. 1 illustrates the structure of a typical computer network. The first part of the network typically comprises a collection of Machines 102, called hosts, intended for running application programs. The network also includes Communication Subnet 104 linking the hosts. The subnet's job is to carry messages from host to host. The subnet typically comprises two basic components: Switching Elements (or Interface Message Processors, IMPs) 106 and Transmission Lines 108. Each host is connected to one, or occasionally several, IMPs.

Figure 2:
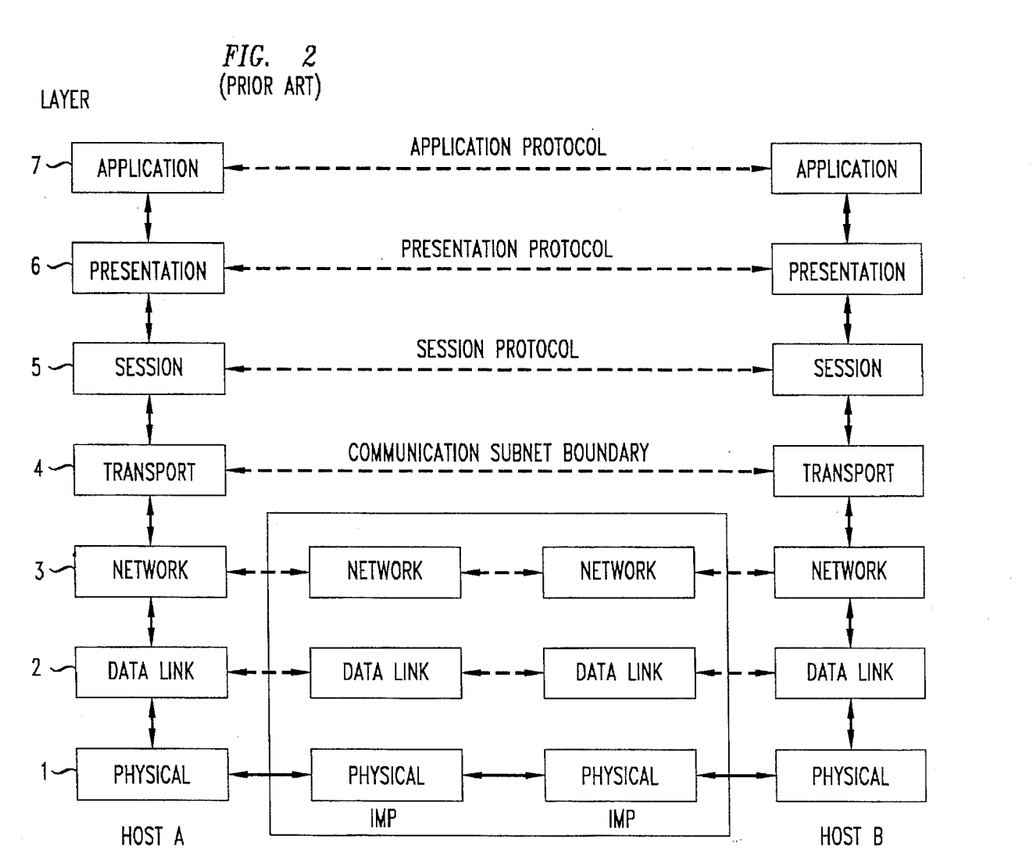
FIG. 2 illustrates a network architecture.

Modern computer networks are typically designed in a highly structured way. To reduce design complexity most computer networks are organized as a series of layers. For example, the Reference Model of Open Systems Interconnection developed by the International Standards Organization (ISO) is a seven layer model. A network architecture based on this model is illustrated in FIG. 2. See, Andrew S. Tanenbaum, *Computer Networks*, Prentice-Hall, Inc., Englewood Cliffs, N.J., 1981. The purpose of each layer is to offer certain services to higher layers, shielding those higher layers from the details of how the offered services are actually implemented. Layer n in one machine carries on a conversation with layer n on another machine. The entities comprising the corresponding layers on different machines are called peer processes or peer layers. This is a virtual communication since only at the lowest layer is there a physical connection. Adjacent layers communicate through interfaces. The interface defines which primitive operations and services the lower layer offers the higher layer.

Each computer network has associated with it a well-defined "protocol" to govern conversations between layer n in one machine and layer n in another machine. A protocol is a complex set of rules for generating instructions represented by physical signals. In particular, protocols use communications channels to physically establish, execute and terminate communications between like or peer layers on the network so that offered services may advantageously be used. See, generally, Tanenbaum, supra; *Engineering and Operations in the Bell System*, Bell Laboratories, Inc., 1983.

Figure 3:
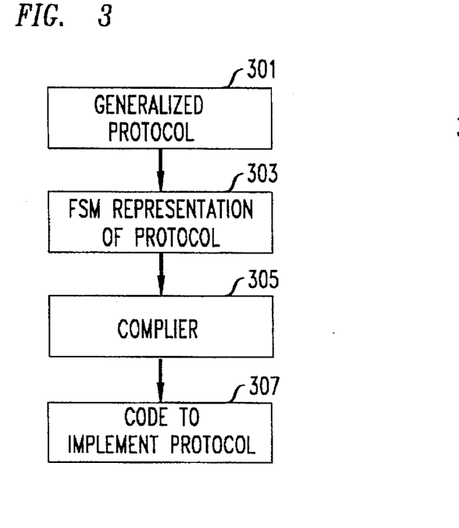
FIG. 3 illustrates a method for implementing a protocol.
Figure 3A:
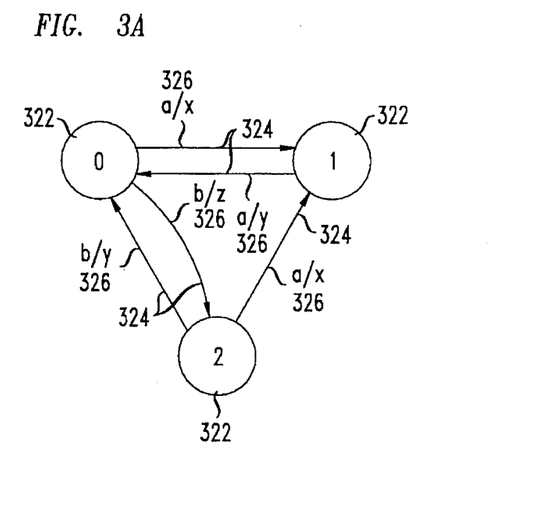
FIG. 3A illustrates a finite state machine (FSM).

Protocol standards are typically defined by bodies such as the ISO and CCITT. A method used to implement a protocol in a computer network is illustrated in FIG. 3. Typically in first step 301, a generalized protocol is described in English with perhaps some computer code or diagrams. From this a precise description (called a formal specification) of a protocol represented as a collection of communicating processes is developed.. Each process, represented as a finite state machine (FSM) communicates with others through input/output operations as defined by the specification. An output operation in a process must have a corresponding input operation in another process, and vice-versa. An FSM representation of a protocol specification consists of a set of states, including an initial state, outputs, inputs, next state function, and output function. A state is defined as a stable condition where the FSM rests until an input is applied. The next state function and output function define the state to which an FSM moves and the output it generates after an input is applied. It is convenient to use a directed graph, called a state diagram, to describe the behavior of an FSM. FIG. 3A illustrates an FSM. The directed graph or FSM comprises states or vertices 322 which represent the FSM states and directed edges which represent transitions between states. Each directed edge 324 is labeled with a notation of i/o 326 operations to specify transitions 322 between states, and the directed edge points to the next state the entity assumes when the proper input is received.

The generalized protocol must then be specified in a formal computer language. For example, the protocol may be specified in a language called the Protocol Specification Language (PSL) which is similar to a subset of the CCITT recommended Specification Description Language (SDL). In both PSL and SDL a protocol is specified as a collection of communicating finite state machines (FSMs) as indicated in step 303. In PSL, for example, a protocol FSM representation may be specified as an input file comprising process definition statements for naming processes; declaration statements specifying the inputs, outputs, states and initial state of a process FSM; and statements defining the transitions that take place when the specified input or output operation occurs. Once specified in a computer language, the protocol may be processed by a compiler as shown in step 305, as for example from PSL to C code, and the code is then implemented in the network as illustrated in step 307.

Figure 4:
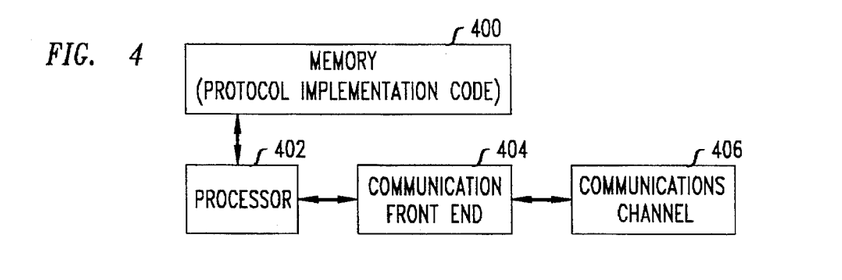
FIG. 4 illustrates a protocol implementation.

FIG. 4 illustrates a typical protocol implementation. Memory 400 contains a protocol implementation code, typically produced by step 305, that defines the services offered by the protocol at each layer. To implement the protocol Processor 402 accesses the code and interfaces with Communication Front End 404. Communication Front End 404 executes functions necessary for sending and receiving signals over Communications Channel 406 such as serial to parallel conversion, packet delineation, etc.

Standard protocols are typically very complex in order to provide a variety of different services and options. However, when a standard protocol is used in a particular application to implement one or more specific services, only a part of the protocol typically is exercised. Thus, implementation of the complete protocol requires more memory and processing time than implementation of only the portion required by the desired services. Further, the complexity of standard protocols is such that the part of the protocol pertaining to a desired service is not readily isolated from the protocol as a whole since the functions offered by the overall protocol are typically interconnected. Although techniques for pruning or thinning FSMs have been disclosed, see D. Lee et al., "Gateway Synthesis from Formal Specifications," Ser. No. 07/752,127, filed Aug. 29, 1991, which is hereby incorporated by reference, these techniques have not been applied to the problem of thinning protocols represented as FSMs. Thus, there is a need for methods which advantageously prune or thin a protocol (i.e., to find a less complex set of rules) to reduce the interconnection surrounding the desired service so as to lessen memory and processing requirements.

SUMMARY OF THE INVENTION

The present invention, in typical embodiment, provides methods for generating a thinned or pruned version of a standard protocol for a desired application or service offered by the protocol that avoid many of the disadvantages associated with use of a standard protocol. In particular, the invention may reduce the memory and processing requirements for invoking the protocol.

Illustrative embodiments of the invention are based on a recognition that a protocol can be represented by a set of processes and that a protocol provides a set of desired services. The protocol is advantageously represented as a collection of communicating finite state machines (FSMs). The desired service is also advantageously specified as an FSM. The illustrative methods find a thinned or reduced version of the protocol by advantageously comparing the finite state machine represented by the standard protocol with the finite state machine represented by the desired service and by removing from the protocol FSM representation those FSM parts not necessary for implementing the desired service. The pruned protocol typically requires less computer memory and processing than the complete standard protocol.

BRIEF DESCRIPTION OF THE DRAWINGS

Other features and advantages of the invention will become apparent from the following detailed description taken together with the drawings in which.

DETAILED DESCRIPTION

I. Introduction

A specification for an entity such as a hardware device, software application or communications protocol may be modeled as an FSM. This section presents a detailed description of methods for thinning a protocol where the protocol is represented as a finite state machine (FSM). An overview on notation useful in describing FSMs is presented in Section II. Section III presents a detailed description of illustrative embodiments of the invention.

II. Notation

A protocol typically provides multiple services. A service may be described as a collection of FSMs. An FSM is a model describing an entity or process where the state of the entity is defined as a stable condition in which the entity rests until a stimulus, called an input, is applied. An input causes the entity to generate an output and to undergo a transition from the current state to a new state, where it stays until the next stimulus. To specify interaction between various machines, interprocess input/output (i/o) operations similar to those used in the language CSP (Communicating Sequential Processes) are employed. Hoare, supra.

For describing a protocol a divide-and-conquer approach may be used in which the protocol is broken up into components where each component can easily be modeled as an FSM with service primitives as its i/o operations. Similarly, communication channels, which have bounded storage, may also be specified as FSMs. Thus, a protocol may be described as a collection of k communicating FSMs, $F_1, F_2, \ldots, F_k$. The FSMs are capable of sending and receiving messages via physical signals over communications channels. These signals physically establish, execute and terminate communications between layers on a network.

An FSM sends a message to other FSMs by means of an "output operation" designated by the "!" symbol. Where, for example, there are two FSMs, machine #1 and machine #2, an output operation in machine #1 is denoted by machine2!msg (i.e., send the message "msg" to machine #2). FSMs also receive messages and for each message that is sent by one FSM there must be a receipt of the message by at least one other FSM.

An FSM receives a message from another FSM by means of an "input operation" designated by the "?" symbol. With respect to the output operation exemplified above, the corresponding input operation in machine #2 is denoted by machine1?msg (i.e., receive the message "msg" from machine #1 ). NOTE: the operations, machine1?msg and machine2?msg are executed simultaneously because they represent different perspectives of the stone event. Neither operation can be executed individually. Thus, if a first FSM attempts to do an output operation, it has to wait until a second FSM is ready to execute the corresponding input operation and vice versa. The synchronized message exchange between two FSMs is called a rendezvous.

When, in an input or output operation, the FSM name is not specified, then the operation can take place with any other FSM that is ready to execute the corresponding operation. For example, if an FSM has an operator ?msg, the FSM is triggered by the receipt of "msg" from any other FSM. Such operations are used to model a protocol's interactions with multiple users on multiple communication channels.

Formally, an FSM is a four-tuple $F=(\Sigma,V,\rho,s_0)$ where $\Sigma$ is an alphabet consisting of all of the FSM's i/o operations and an internal operation called Int; V is a finite set of states that the FSM may be in; $\rho: V \times \rho \rightarrow 2^V$ is a nondeterministic state transition function (e.g., machine?msg or machine?msg); and $s_0$ is the initial state of the FSM. An internal operation within the FSM is an unobservable action. While doing an internal transition from one state to another state, an FSM makes a state transition without interacting with any other FSM. See generally, Z. Kohavi, *Switching Theory and Finite Automata Theory*, McGraw-Hill, 275–315 (1978) and C. A. R. Hoare, "Communicating Sequential Processes," *Communications of the ACM*, Vol. 21, No. 8,666–677 (August 1978).

As noted above, an FSM may be represented as a directed graph (V,E) where V is the set of states in the FSM and E is the set of edges or possible state transitions between states. Each state of an FSM is represented in a directed graph by a circle encircling the designation of the state. Each edge is labeled by an i/o operation (belonging to $\Sigma$) which either triggers the state transition or is a result of the state transition. Additionally, an edge may be labeled by two or more i/o operations which independently or in conjunction trigger the state transition or are the result of it. If e is an edge connecting one state $s_1$ to another state $s_2$, then its tail state is $s_1$ and its head state is $s_2$. Let the set of outgoing edges from state $s_3$ be ED($s_3$). The head states of the edges in ED ($s_3$) are called successor states of $s_3$.

For notational purposes, an edge labeled by a*b denotes an edge labeled by an i/o operation a followed by an i/o operation b. The symbol "*" represents the boolean AND operator. Therefore, an edge labeled by ?ackO*?cancel is only triggered by the receipt of the messages "ack0" and "cancel". An edge labeled by ?ackO*!start is triggered by the receipt of the message ackO and triggers the sending of the message start. An edge labeled by a+b denotes an edge labeled by two i/o operations: a and b. The symbol "+" represents the boolean OR operator. For example, and edge labeled by ?ack1+?start is triggered by the receipt of either of the messages "ackl" or "start".

Note that if an edge in one FSM is labeled by an i/o operation that has no corresponding operation in another FSM, the transition can never occur. For example, if an edge in machine1 is labeled machine2 ?msg, and machine2 contains no edge labeled machine1?msg, the transition in machine1 can never occur. The label of an edge e is given as label (e).

Directed graphs may be characterized as strongly connected or weakly connected. A directed graph is strongly connected if for each pair of distinct states in the FSM graph there exists a directed path from one to the other. A directed graph is weakly connected if there is no directed path to each state from every other state.

An FSM always starts in its initial state $s_o$. The initial state is labeled 0 and may be designated in the directed graph representing the FSM by the presence of a concentric circle surrounding the 0. When the FSM is in any given state it can execute any of the operations labeling a transition from that state. Recall that a protocol provides one or more services to the user of the protocol. These are also represented as an FSM called the service FSM. The i/o operations for the service FSM are service primitives of the protocol. Note: there is not necessarily a one-to-one mapping (or correlation) between the set of services provided by a protocol and the set of FSMs that can represent the protocol.

For any two FSMs $F_1$ and $F_2$, an FSM designated $F_1\#F_2$ can be built that corresponds to the joint behavior of $F_1$ and $F_2$. The FSM $F_1\#F_2$ is called the reachable FSM or the composition of $F_1$ and $F_2$. The process of constructing $F_1\#F_2$ from the components $F_1$ and $F_2$ is called the reachability computation or composing and is well known in the art. Finding the reachable FSM is done by computing the reachable global states. A global state for $F_1\#F_2$ is defined as a two-tuple $(s_1,s_2)$, where $s_1$ is the current state of $F_1$ and $s_2$ is the current state of $F_2$. In the reachability computation, there is a potential problem of state explosion, but procedures have been developed to reduce the problem. See, K. K. Sabnani, A. M. Lapone and M. U. Uyar, "An Algorithmic Procedure for Checking Safety Properties of Protocols," *IEEE Trans. Comm.*, Vol. 37, No. 9, 940–948, September 1989.

III. Methods for Thinning Protocols

A. Overview

Figure 5:
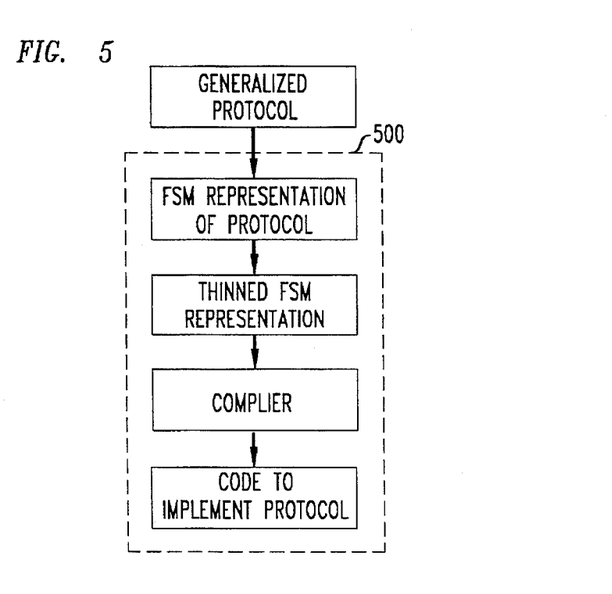
FIG. 5 illustrates a method for generating a thinned protocol for use in a network.

This section describes two methods for thinning protocols which examine the FSM representation both of the protocol and of the set of desired services. FIG. 5 shows Translation System 500 which illustrates how the methods for thinning protocols are employed so that a thinned protocol may be implemented in the computer network. As with the protocol implementation method illustrated in FIG. 3, a protocol standard is translated from a language such as English to a computer language. Then the invention .thins the FSM representation and then the thinned representation may be compiled and placed in a memory chip, such as Memory 400 illustrated in FIG. 4, for use in the network.

Figure 6:
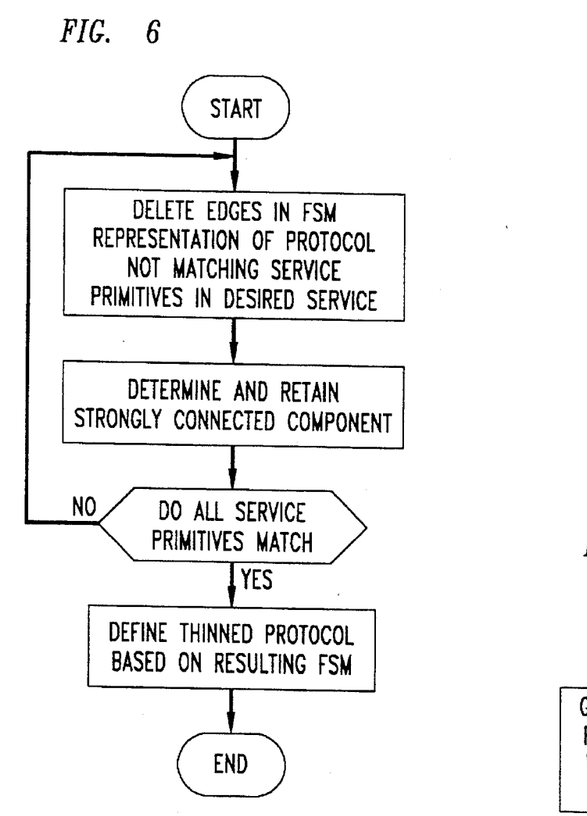
FIG. 6 illustrates the method associated with thinning a protocol according to a first embodiment of the invention.

A first illustrative embodiment of the invention for thinning a protocol is illustrated in FIG. 6 and may be constructed with the following steps:

1. Delete edges on the FSM representation of the protocol labeled with service primitives other than those of the service of interest.
2. Retain the strongly connected component in each FSM.
3. Repeat steps 1 and 2 until no edges can be deleted and generate a protocol based on the resulting FSM.

This method, called Method 1, is described in detail in part B of this section.

Figure 7:
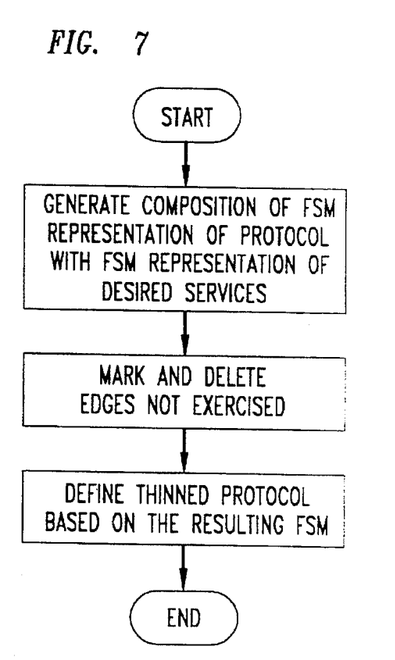
FIG. 7 illustrates the method associated with thinning a protocol according to a second embodiment of the invention.

FIG. 7 presents a flow chart representation of a second illustrative embodiment of the present invention which may be used to thin a protocol. In this embodiment a protocol is modeled as a finite state machine. Similarly, the set of required or desired services provided by the protocol are also modeled as an FSM. The thinned version of the protocol is found by comparing the FSM representations of the protocol and services and removing from the protocol those aspects of the FSM representation not necessary for providing the services. The thinned protocol may be constructed with the following steps as illustrated in FIG. 7:

1. Determine the composition of the desired service with the protocol where the protocol is modeled as FSMs representing end entities and communications channels.
2. Remove from the composition the edges of the FSM representations of the end entities which are not exercised.
3. The thinned protocol is the resulting composition.

This method, called Method 2 is described in detail in part C of this section.

B. Method 1

Recall that protocol typically provides multiple services and that a service is modeled as a finite state machine with service primitives as its i/o operations. Method 1 computes a pruned set of communicating FSMs which provide only one service $S_j$ among all services provided by the protocol, $S_j$, j=0, 1, ..., r. The method collects the component FSMs for the protocol entity to be tested, the FSMs in its peer-level or peer layer entity, and the communication channels connecting them. Let this group be a set of machines, $F_i$, i=1, ..., k. The procedure for computing a pruned set of machines which provides the service $S_j$ is described below.

Given component machines $F_i$, i=1, ... k, first delete transitions that are labeled with service primitives other than those of $S_j$. Then delete transitions that have no matching service primitives. Then, for each FSM, the method determines and retains the strongly connected component that starts at the initial state and discards the rest of the machine. As noted previously, a strongly connected component or a strongly connected graph is defined as a subgraph in which there is a path from every state to every other state. As a result of pruning one FSM, some edges of other machines may no longer have matching i/o's, and they are also deleted. For those FSMs with edges removed, again compute the strongly connected components starting from their initial states and discard the rest of the machines. Continue this process iteratively until each reduced machine consists of a strongly connected component that contains the initial state and in which every i/o transition has matching i/o transitions. FSMs for protocols that do not have infinite loops for data transfer are made strongly connected by adding some dummy transitions. Examples of such protocols are connection management and call setup protocols. Intuitively, the idea behind this method is to remove those parts of the protocol machines that can be reached only by applying unmatched service primitives and that the remaining machines have to be strongly connected.

FIG. 6 illustrates the method, and a pseudo-code representation of the method is presented below.

---

Method 1 Pseudo-code:

--- begin
  initialize a data structure MATCH to keep track of all
  matched I/O's:
  initialize a list of active component machines: L=∅
  for (each FSM $F_i$) do
    delete transitions on service primitives not in $S_j$;
  end
  for (each FSM $F_i$)do
    if ($F_i$ contains a service primitive edges not matched) then do
      delete all such edges;
      /*delete edges with labels = unmatched service primitives*/
      append $F_i$ to L;
      /*to be further reduced*/
  end

---

-continued

Method 1 Pseudo-code:

--- end
while (L is not empty) do
  /*reduce component machines iteratively*/
  remove an $F_i$ from L;
  compute the strongly connected component $C_i$
    of $F_i$ that contains the initial state;
  delete edges of $F_i$ that are not in $C_i$;
  update MATCH with respect to edges deleted;
end return reduced machines $\tilde{F}_i$,
i = 1, ..., k;
end

---

The set of reduced machines; $\tilde{F}_i$, i=1, ..., k, contains the pruned protocol.

The use of data structures (which are simply collections of variables, possibly of several different data types, connected in various ways) to represent directed graphs is well known. For example, one common representation of a directed graph is the adjacency matrix which is an nxn matrix A of booleans where A[i,j] is true if and only if there is an edge between i and j. The Method 1 pseudocode above uses a data structure MATCH to keep track of corresponding i/o's. Identical i/o's are associated with a counter which records their total number. Counters of corresponding i/o's are associated with each other. When an i/o is deleted, its associated counter is decreased by one. When a counter becomes zero, check all its associated counters as follows: If a counter μ has no corresponding counters (all of them have become zero), then change μ to zero and delete all its associated i/o's. The associated counters of μ are processed similarly. This counter updating is done iteratively until none of the counters have to be changed. On the other hand, whenever an i/o is deleted from a machine, append the FSM to the list of active component machines if the FSM is not there. Whenever a component FSM $F_i$ is appended to L, at least one edge has been removed. Whenever a component FSM $F_i$ is removed from L construct the strongly connected component that contains the initial state.

C. Method 2

Figure 8:
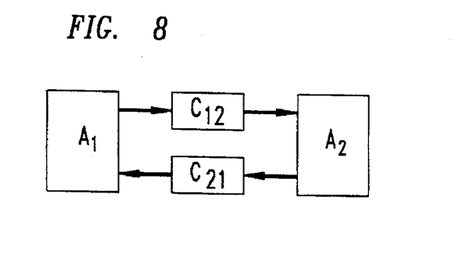
FIG. 8 illustrates the component finite state machines comprising a computer protocol.
Figure 9:
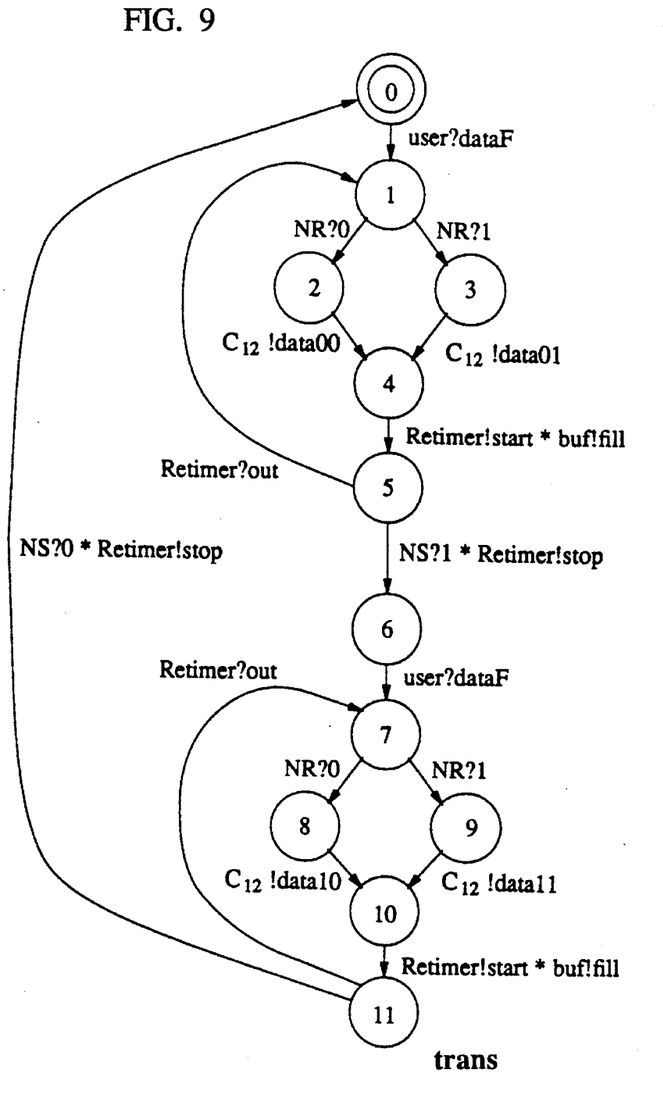
FIG. 9 illustrates the finite state machine for the FABP Transmitter trans.
Figure 10:
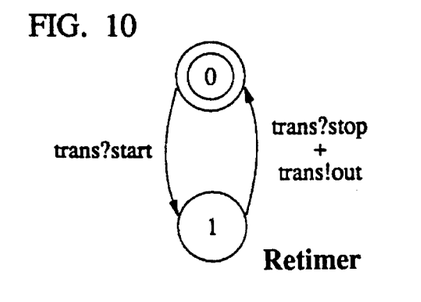
FIG. 10 illustrates the finite state machine for the FABP Process Retimer.
Figure 11:
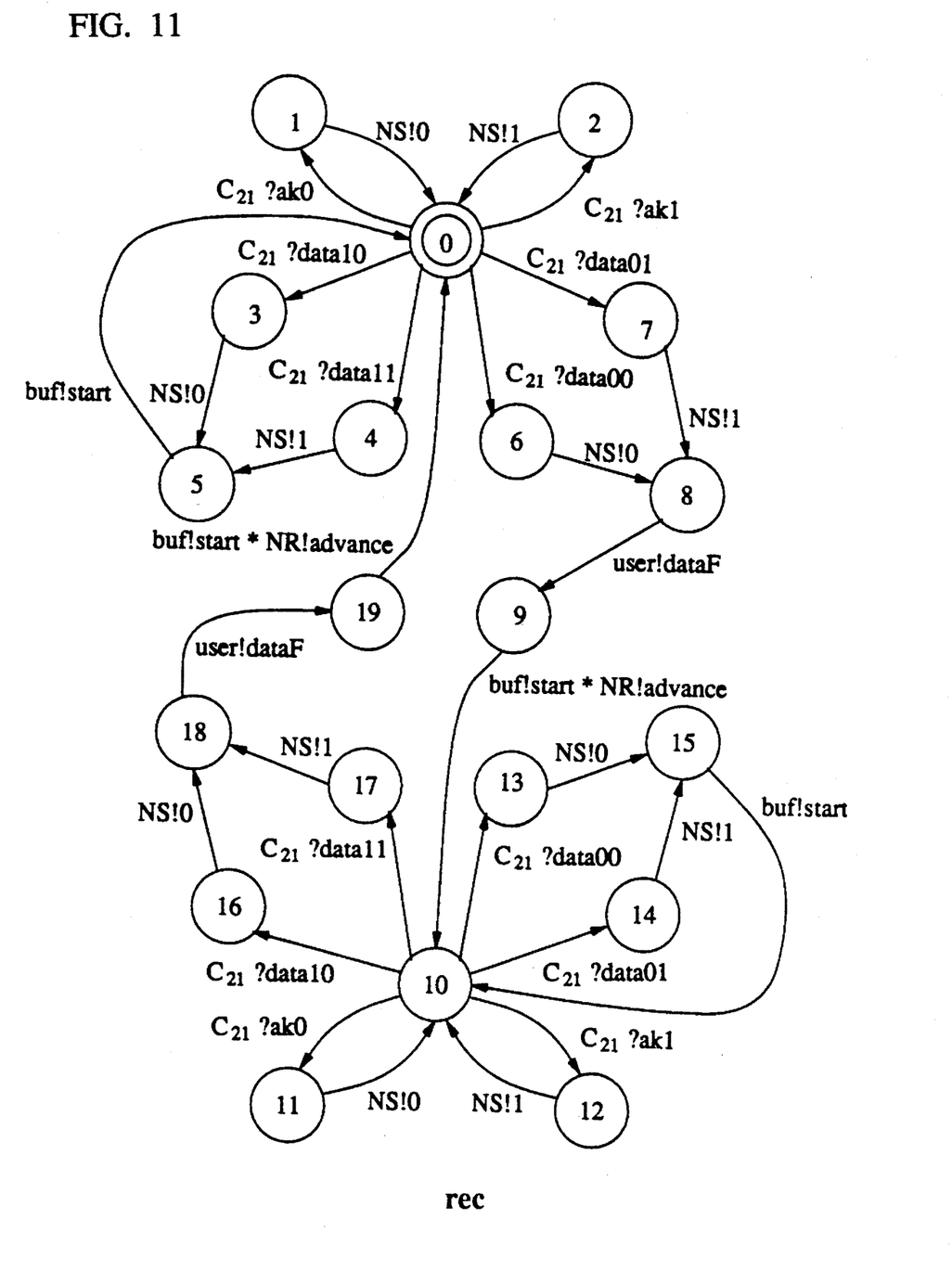
FIG. 11 illustrates the finite state machine for the FABP Receiver rec.
Figure 12:
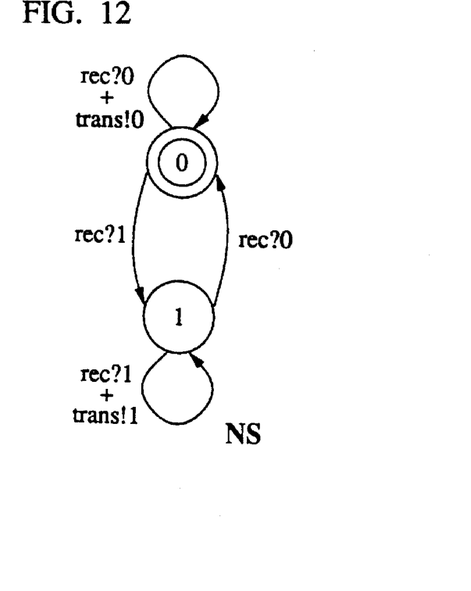
FIG. 12 illustrates the finite state machine for the FABP Process NS.
Figure 13:
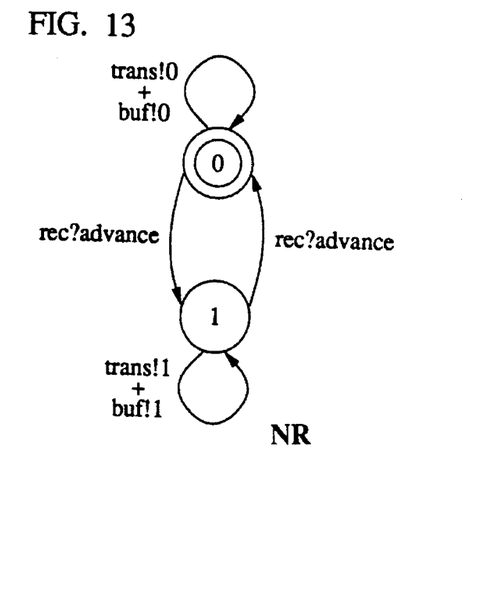
FIG. 13 illustrates the finite state machine for the FABP Process NR.
Figure 14:
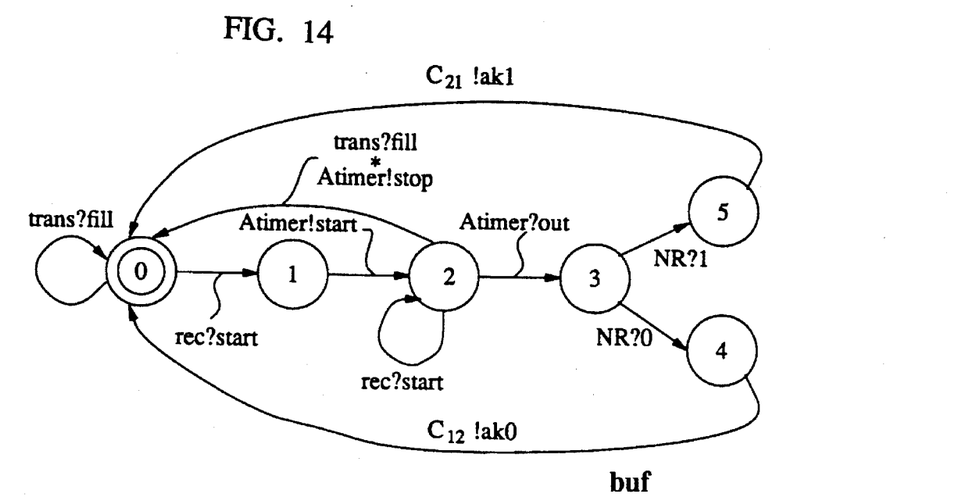
FIG. 14 illustrates the finite state machine for the FABP Process buf.
Figure 15:
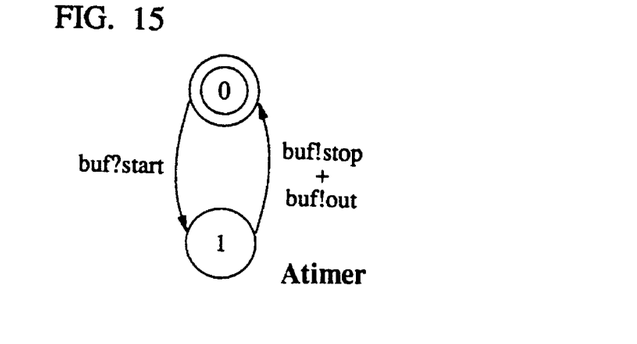
FIG. 15 illustrates the finite state machine for the FABP Process Atimer.

A protocol, A, may illustratively be modeled as four FSMs, $A_1$, $A_2$, $C_{12}$, $C_{21}$, as shown in FIG. 8. $A_1$ and $A_2$ are two end entities (i.e. associated with different computers), and $C_{12}$ and $C_{21}$ represent half-duplex (one-way) communication channels between $A_1$ and $A_2$. $C_{12}$ ($C_{21}$) transports messages from $A_1(A_2)$ to $A_2$ ($A_1$). When a first entity such as $A_1$ desires to invoke a particular set of services S involving entity $A_2$, protocol A must be involved. Protocol A contains not only the FSM representation of the desired set of services S, but of other services as well. The thinned protocol consists only of the portion of the FSM protocol model of A necessary for providing S.

In short, the set of desired services and protocol A are specified as an FSM S. Only those parts of $A_1$ and $A_2$ that are necessary for providing S are retained in the thinned protocol, i.e. the method keeps only those parts of $A_1$ and $A_2$ necessary to provide the desired service. The following procedure, as shown in FIG. 7, will prune or thin the protocol:

1. Compute S #$A_1$ #$C_{12}$ #$C_{21}$ #$A_2$. During this composition, mark those edges in the component FSMs $A_1$ and $A_2$ that are exercised.
2. After completing the composition, remove the edges that are not marked. The remaining edges in these machines are necessary for providing S.
3. Let the machines $A_1$ and $A_2$ after removing the unmarked edges be denoted as $A_1'$ and $A_2'$.

4. The "pruned" or "thinned" protocol consists of $A_1'$, $A_2'$, $C_{12}$, and $C_{21}$.

D. An Example

An embodiment of the invention is illustrated in FIG. 8 in which two computers, $A_1$ and $A_2$, wish to exchange information. For illustrative purposes the protocol for the data transfer is defined as a full-duplex alternating bit (FABP) protocol (FABP). FABP consists of two identical protocol entities and two communications channels which are characterized as unreliable FIFO channels. The two physical communications channels are $C_{12}$ and $C_{21}$. For this illustrative example, a pruned or thinned version of the protocol is found which generates physical signals to establish, maintain and terminate the physical link between the computers and which allows for transmission of data over the link.

Figure 16:
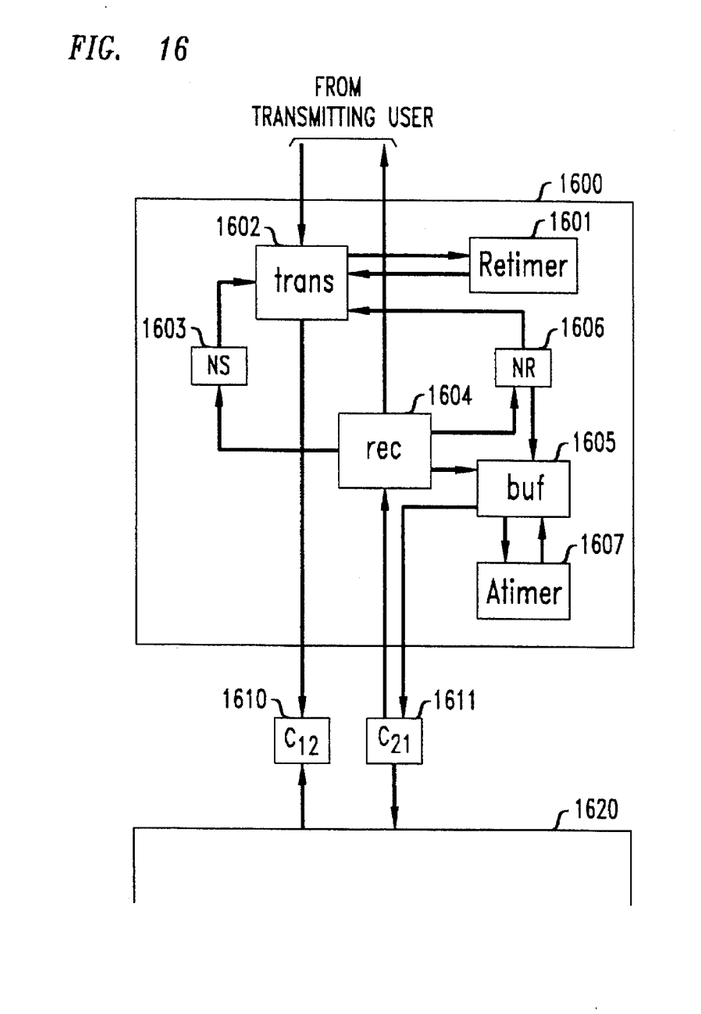
FIG. 16 illustrates the components FSMs of the FABP protocol.
Figure 17:
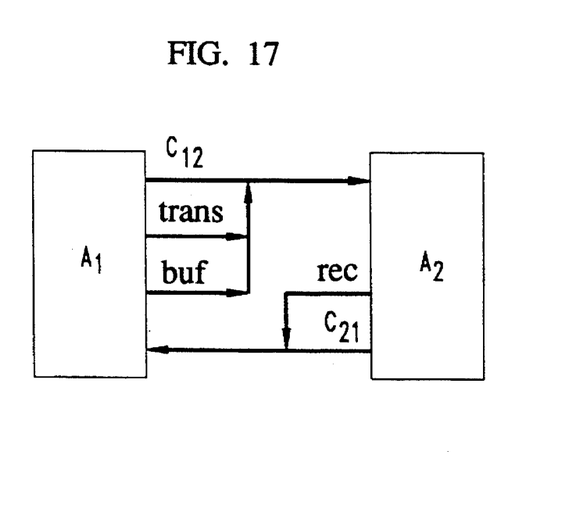
FIG. 17 illustrates the parts of an illustrative protocol which generate signals over a communications channel prior to protocol thinning.

Each of the illustrative, unthinned protocol entities may be modeled as seven FSMs as shown in FIGS. 9–15; these seven FSMs are trans, Retimer, rec, NS, NR, buf, and Atimer, respectively. The structure of the component processes of the protocol are illustrated in FIG. 16. The seven FSMs 1601–1607 of First Entity 1600 or $A_1$ communicate via Communications Channels 1610 and 1611 to Second Entity 1620 or $A_2$. Second Entity 1620 also contains seven FSMs arranged in a fashion similar to First Entity 1600. The parts of the protocol which generate signals over the communications channel for interaction with $A_2$ are illustrated in FIG. 17. FSM trans takes care of transmission of outgoing messages and of acknowledgements. Data messages piggyback acknowledgements. Retimer is the retransmission timer. If an acknowledgement is not received within a certain time-out period after sending a data message, then this data message is retransmitted. FSM rec takes care of incoming messages: data messages and explicit acknowledgements. FSMs NS and NR store sequence numbers of the next message to be sent and of the next expected message. FSM buf takes care of sending acknowledgements. When a data message is received buf starts a time Atimer. If a data message is not sent out before Atimer expires, an explicit acknowledgement is sent.

A data message has the structure dataxy where x is the sequence number of the message with two values (0; 1) and y is the piggybacked acknowledgement with two values (0; 1). There are two types of explicit acknowledgements: ak0 and ak1. Transmission of datax0 (datax1) or ak0 (ak1) means that the next expected message has the sequence number 0(1). The composition of these seven FSMs has approximately 4,848 states and 15,312 edges.

Figure 18:
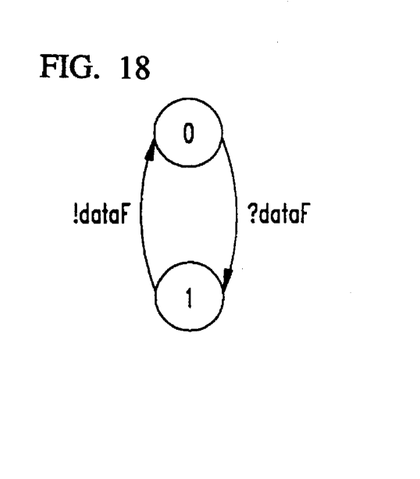
FIG. 18 illustrates the service FSM for a full-duplex alternating protocol (FABP), $S_F$.
Figure 19:
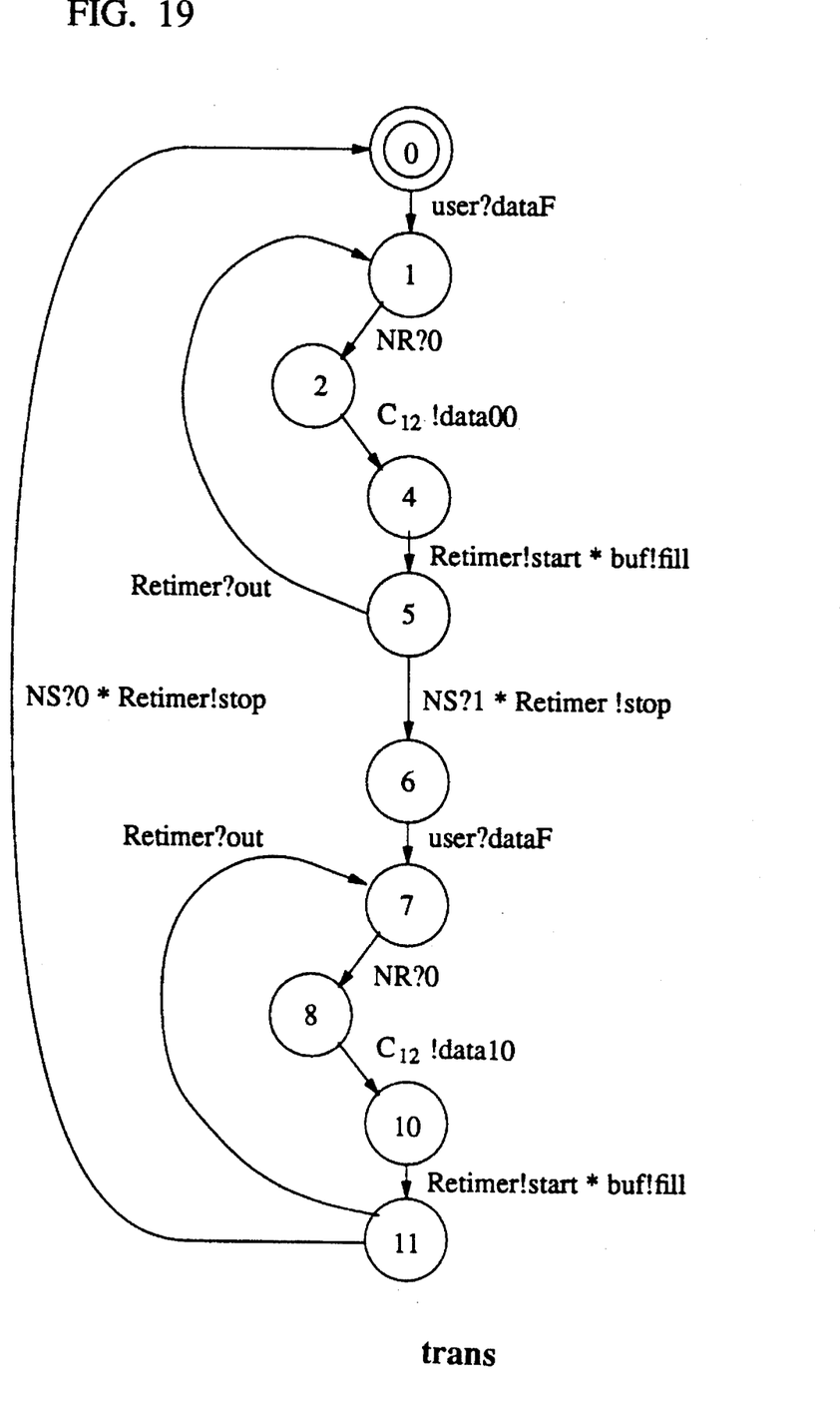
FIG. 19 illustrates the finite state machine for the pruned FABP Transmitter trans.
Figure 20:
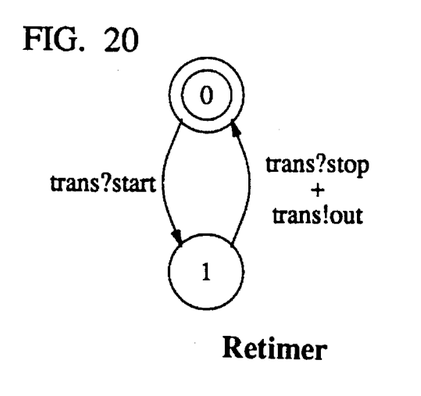
FIG. 20 illustrates the finite state machine for the pruned FABP Process Retimer.
Figure 21:
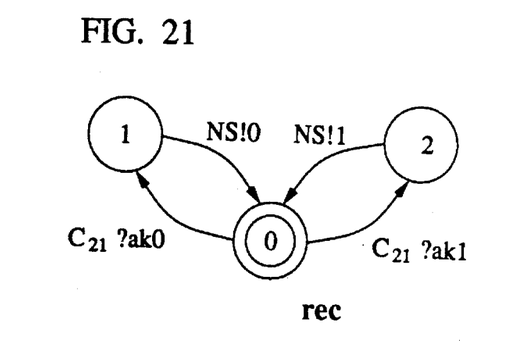
FIG. 21 illustrates the finite state machine for the pruned FABP Receiver tee.
Figure 22:
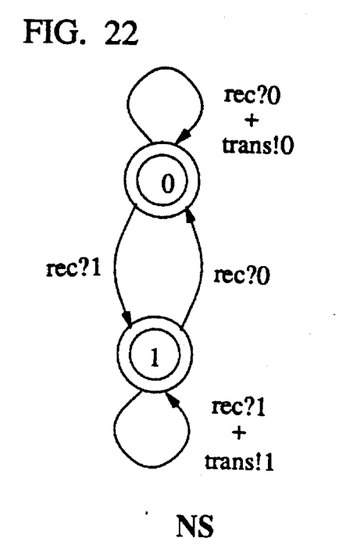
FIG. 22 illustrates the finite state machine for the pruned FABP Process NS.
Figure 23:
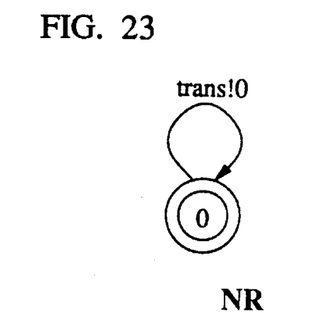
FIG. 23 illustrates the finite state machine for the pruned FABP Process NR.
Figure 24:
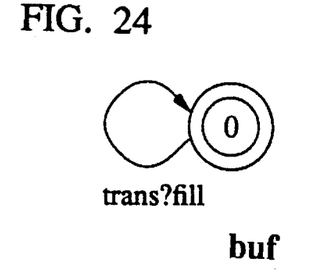
FIG. 24 illustrates the finite state machine for the pruned FABP Process buf.
Figure 25:
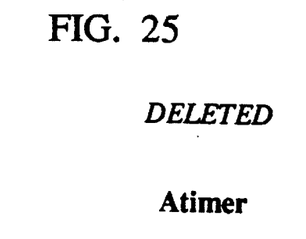
FIG. 25 illustrates the finite state machine for the pruned FABP Process Atimer.
Figure 26:
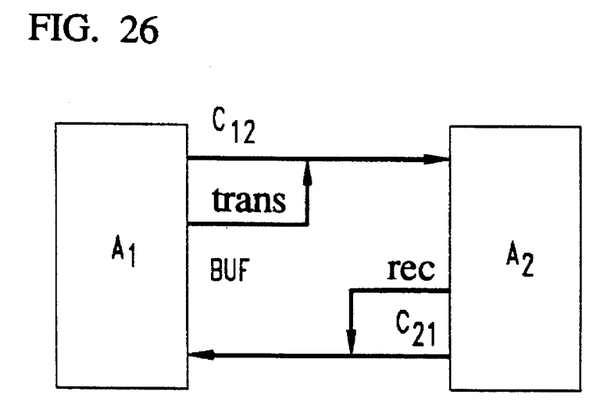
FIG. 26 illustrates the parts of an illustrative protocol which generates signals over a communications channel after thinning.

This protocol provides two services: forward data transfer and reverse data transfer. The service FSM for FABP, $S_F$, shown in FIG. 18 provides data transport in the forward direction. In this machine, the protocol picks up a message from one user process using the input operation (?dataF) and delivers it to the other user process using the output operation (?tdataF). The FSM representations of the pruned protocol are illustrated in FIGS. 19–25. FIG. 26 illustrates the parts of the thinned protocol which generate signals over the communications channel for interaction with $A_2$. The composition of these pruned machines using Method 2 has approximately 48 states and 109 edges. As these figures illustrate, the method may simplify the protocol so that a reduced number of signals need be generated to invoke the desired service thereby reducing processing time.

For this example, Method 1 yields the same results as Method 2. However, as a general rule, Method 2 generates at least as good a thinned protocol as Method 1. However, Method 2 requires a determination of the composition of the processes. This examination of joint behavior makes large demands on system memory capabilities and thus makes Method 2 a less attractive means for thinning complex protocols. Method 2 also risks encountering the state-explosion problem previously mentioned. Method 1 will always contain at least the result generated by Method 2 and is less demanding on system memory and processing.

This disclosure deals with methods for thinning protocols. The methods have been described without reference to specific hardware or software. Instead the methods have been described in such a manner that those skilled in the art can readily adapt such hardware or software as may be available or preferable.

We claim:

1. A method of simplifying control of a subset of services in a communications process in accordance with a specific set of rules, said specific set of rules comprising a subset of a complex set of rules, said specific set of rules being generated by the steps of:

(a) storing first signals representative of said complex set of rules, wherein said first signals characterize a finite state machine representation of said complex set of rules and wherein said first signals comprise signals characterizing states and signals characterizing edges representing input/output operations and internal and external transitions between said states in said finite said machine representation;

(b) storing second signals representative of a set of rules for a subset of services, wherein said second signals comprise signals characterizing edges representing service primitives of a finite state machine representation of said set of rules for said subset of services;

(c) comparing said first signals to said second signals and deleting from said first signals a first set of signals characterizing edges with no match in said second signals;

(d) selecting from said first signals a second set of signals representative of said specific set of rules, wherein said second set of signals characterize a strongly connected graph; and (e) repeating steps (c) and (d) until said second set of signals characterize only a strongly connected graph with no unmatched edges.

2. A method for reducing the complexity of a protocol, wherein said protocol generates a set of signals to regulate communications between peer layers in a computer network, wherein said protocol also generates signals for executing a plurality of services, and wherein only a desired subset of services of said plurality of services is required, said method comprising the steps of:

(a) generating a first finite state machine representations of said protocol and of said desired subset of services, wherein each of said representations comprises states and edges, wherein said edges represent input/output operations and internal and external transitions between said states and wherein each of said representations has an initial state;

(b) deleting edges in said protocol finite state machine representation which do not correspond to edges of said finite state machine representation of said desired subset of services to yield a second finite state machine representation of said protocol;

(c) determining a set of strongly connected edges of a finite state machine representation of said protocol equal to a strongly connected component of the second finite state machine representation which contains the initial state;

(d) removing from said second finite machine representation of said protocol edges not within said set of strongly connected edges; and (e) repeating steps (b) through (d) until said second finite state machine representation of said protocol comprises a strongly connected component comprising the initial state and edges which are strongly connected.

3. A method for reducing the complexity of a protocol, wherein said protocol generates a set of signals to regulate communications between peer layers in a computer network, wherein said protocol also generates signals for executing a plurality of services, and wherein only a desired subset of services of said plurality of services is required, said method comprising the steps of:

storing first signals representative of a finite state of machine representation of said protocol and second signals representative of said desired subset of services, wherein each of said representation comprises edges and states, wherein said edges represent input/output operations and internal and external transitions between said states;

generating third signals representative of the composition of said protocol and of said desired subset of services; and deleting from said third signals a set of signals representative of edges in said composition not exercised in forming said composition to form said subset of services.

4. An apparatus comprising a memory which contains code for implementing a subset of services in a communications process in accordance with a specific set of rules, said specific set of rules comprising a subset of a complex set of rules, said specific set of rules having been generated by the steps of:

(a) storing first signals representative of said complex set of rules, wherein said first signals characterize a finite state machine representation of said complex set of rules and wherein said first signals comprise signals characterizing states and signals characterizing edges representing input/output operations and internal and external transitions between said states in said finite said machine representation;

(b) storing second signals representative of a set of rules for a subset of services, wherein said second signals comprise signals characterizing edges representing service primitives of a finite state machine representation of said set of rules for said subset of services;

(c) comparing said first signals to said second signals and deleting from said first signals a first set of signals characterizing edges with no match in said second signals;

(d) selecting from said first signals a second set of signals representative of said specific set of rules, wherein said second set of signals characterize a strongly connected graph; and (e) repeating steps (c) and (d) until said second set of signals characterize only a strongly connected graph with no unmatched edges.

5. An apparatus comprising a memory which contains code for implementing a desired subset of services in a plurality of services, wherein said plurality of services are executed by signals generated by a protocol for regulating communications between peer layers in a computer network, said desired subset of services having been generated by the steps of:

(a) generating a first finite state machine representations of said protocol and of said desired subset of services, wherein each of said representations comprises states and edges, wherein said edges represent input/output operations and internal and external transitions between said states and wherein each of said representations has an initial state;

(b) deleting edges in said protocol finite state machine representation which do not correspond to edges of said finite state machine representation of said desired subset of services to yield a second finite state machine representation of said protocol;

(c) determining a set of strongly connected edges of a finite state machine representation of said protocol equal to a strongly connected component of the second finite state machine representation which contains the initial state;

(d) removing from said second finite machine representation of said protocol edges not within said set of strongly connected edges; and (e) repeating steps (b) through (d) until said second finite state machine representation of said protocol comprises a strongly connected component comprising the initial state and edges which are strongly connected.

6. An apparatus comprising a memory which contains code for implementing a desired subset of services in a plurality of services, wherein said plurality of services are executed by signals generated by a protocol for regulating communications between peer layers in a computer network, said desired subset of services having been generated by the steps of:

storing first signals representative of a finite state of machine representation of said protocol and second signals representative of said desired subset of services, wherein each of said representation comprises edges and states, wherein said edges represent input/output operations and internal and external transitions between said states;

generating third signals representative of the composition of said protocol and of said desired subset of services; and deleting from said third signals a set of signals representative of edges in said composition not exercised in forming said composition to form said subset of services.

* * * * *